US011809298B2

(12) United States Patent
Basel et al.

(10) Patent No.: US 11,809,298 B2
(45) Date of Patent: Nov. 7, 2023

(54) SYSTEM AND METHOD OF GROUPING INFORMATION HANDLING SYSTEMS FOR SOFTWARE UPDATES

(71) Applicant: Dell Products L.P., Round Rock, TX (US)

(72) Inventors: Tek Prasad Basel, Austin, TX (US); Nikhil Manohar Vichare, Austin, TX (US); Wen-hao Zeng, Round Rock, TX (US); Selvadeepan Gunasekaran, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 258 days.

(21) Appl. No.: 17/443,031

(22) Filed: Jul. 20, 2021

(65) Prior Publication Data
US 2023/0028708 A1    Jan. 26, 2023

(51) Int. Cl.
| | |
|---|---|
| *G06F 11/34* | (2006.01) |
| *G06F 8/65* | (2018.01) |
| *H04L 67/10* | (2022.01) |
| *G06N 20/00* | (2019.01) |
| *G06F 11/30* | (2006.01) |

(52) U.S. Cl.
CPC ............ *G06F 11/3409* (2013.01); *G06F 8/65* (2013.01); *G06N 20/00* (2019.01); *H04L 67/10* (2013.01); *G06F 11/3058* (2013.01)

(58) Field of Classification Search
CPC ......... H04L 67/10; H04L 67/34; H04L 41/16; G06N 20/00; G06F 11/3058; G06F 11/3409; G06F 8/65
USPC ........................................................ 702/182
See application file for complete search history.

(56) References Cited

U.S. PATENT DOCUMENTS

| | | | |
|---|---|---|---|
| 11,426,662 B2 * | 8/2022 | Leland | ..................... A63F 13/77 |
| 2021/0232425 A1 * | 7/2021 | Cox | .................... G06F 11/3017 |
| 2021/0234938 A1 * | 7/2021 | Cox | .................. H04M 1/72448 |

\* cited by examiner

*Primary Examiner* — John H Le
(74) *Attorney, Agent, or Firm* — McDermott Will & Emery LLP

(57) ABSTRACT

In one or more embodiments, one or more systems, one or more methods, and/or one or more processes may: receive a first multiple telemetry data from multiple information handling systems (IHSs); determine first multiple performance health scores respectively associated with the IHSs; determine first multiple availability scores respectively associated with the IHSs; determine first multiple information handling system (IHS) update churn scores respectively associated with the IHSs; determine, via a machine learning process, a second distribution of the IHSs to the multiple IHS groups based at least on the first multiple IHS and performance health scores, the first multiple availability scores, and the first multiple IHS churn scores; and provide a first software update to IHSs of each IHS group.

17 Claims, 7 Drawing Sheets

|  | Health Score | Availability Score | Update Churn Score |
|---|---|---|---|
| Group 210 | Best | High Availability | Low Recent Churn Score |
| Group 220 | ⬇ | ⬇ | ⬆ |
| Group 230 | ⬇ | ⬇ | ⬆ |
| Group 240 | Low / Unknown | Low / Unknown | High / Unknown |

250

SYSTEM AND METHOD OF GROUPING INFORMATION HANDLING SYSTEMS FOR SOFTWARE UPDATES

BACKGROUND

Field of the Disclosure

This disclosure relates generally to information handling systems and more particularly to grouping information handling systems for software updates.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may receive, via first user input, a first distribution of multiple information handling systems to multiple information handling system groups; may receive first multiple telemetry data from the multiple information handling systems; may determine, based at least on the first multiple telemetry data, first multiple performance health scores respectively associated with the multiple information handling systems, first multiple availability scores respectively associated with the multiple information handling systems, and first multiple information handling system update churn scores respectively associated with the multiple information handling systems; may determine, via a machine learning process, a second distribution of the multiple information handling systems to the multiple information handling system groups based at least on the first multiple performance health scores, the first multiple availability scores, and the first multiple information handling system update churn scores; may provide a first software update to information handling systems of each of the multiple information handling system groups; may receive second multiple telemetry data from the multiple information handling systems; may determine, based at least on the second multiple telemetry data, second multiple performance health scores respectively associated with the multiple information handling systems, second multiple availability scores respectively associated with the multiple information handling systems, and second multiple information handling system update churn scores respectively associated with the multiple information handling systems; may determine, via the machine learning process, a third distribution of the multiple information handling systems to the multiple information handling system groups based at least on the second multiple performance health scores, the second multiple availability scores, and the second multiple information handling system update churn scores, in which at least one information handling system that was previously included in an information handling system group of the multiple information handling system groups is included in another information handling system group of the multiple information handling system groups; and may provide a second software update to information handling systems of each of the multiple information handling system groups.

In one or more embodiments, determining the first multiple performance health scores may include determining multiple alert scores respectively associated with the multiple information handling systems. For example, determining the multiple alert scores may include determining multiple numerical values associated with multiple attributes associated with the multiple information handling systems. For instance, determining the multiple alert scores may include weighting the multiple numerical values associated with the multiple attributes.

In one or more embodiments, the machine learning process may include at least one of a k-means clustering machine learning process, a density based clustering machine learning process, and an autoencoder machine learning process, among others. In one or more embodiments, the one or more systems, the one or more methods, and/or the one or more processes may further receive, via second user input, multiple percentages of the multiple information handling systems respectively associated with the multiple information handling system groups. For example, the second distribution may distribute the multiple information handling systems to the multiple information handling system groups in accordance with the multiple percentages.

In one or more embodiments, the one or more systems, the one or more methods, and/or the one or more processes may further: receive second multiple telemetry data from the multiple information handling systems; determine second multiple performance health scores respectively associated with the multiple information handling systems based at least on the second multiple telemetry data; determine second multiple availability scores respectively associated with the multiple information handling systems based at least on the second multiple telemetry data; determine second multiple information handling system update churn scores respectively associated with the multiple information handling systems based at least on the second multiple telemetry data; determine, by the machine learning process, a third distribution of the multiple information handling systems to the multiple information handling system groups based at least on the second multiple performance health scores, the second multiple availability scores, and the multiple information handling system update churn scores; provide a second software update to information handling systems of the first information handling system group; provide the second software update to information handling systems of the second information handling system group; provide the second software update to information handling systems of the third information handling system group; and provide the second software update to information handling systems of the remaining information handling system group. For example, the second information handling system group may include at least one information handling system that was previously included in the third information handling system group.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
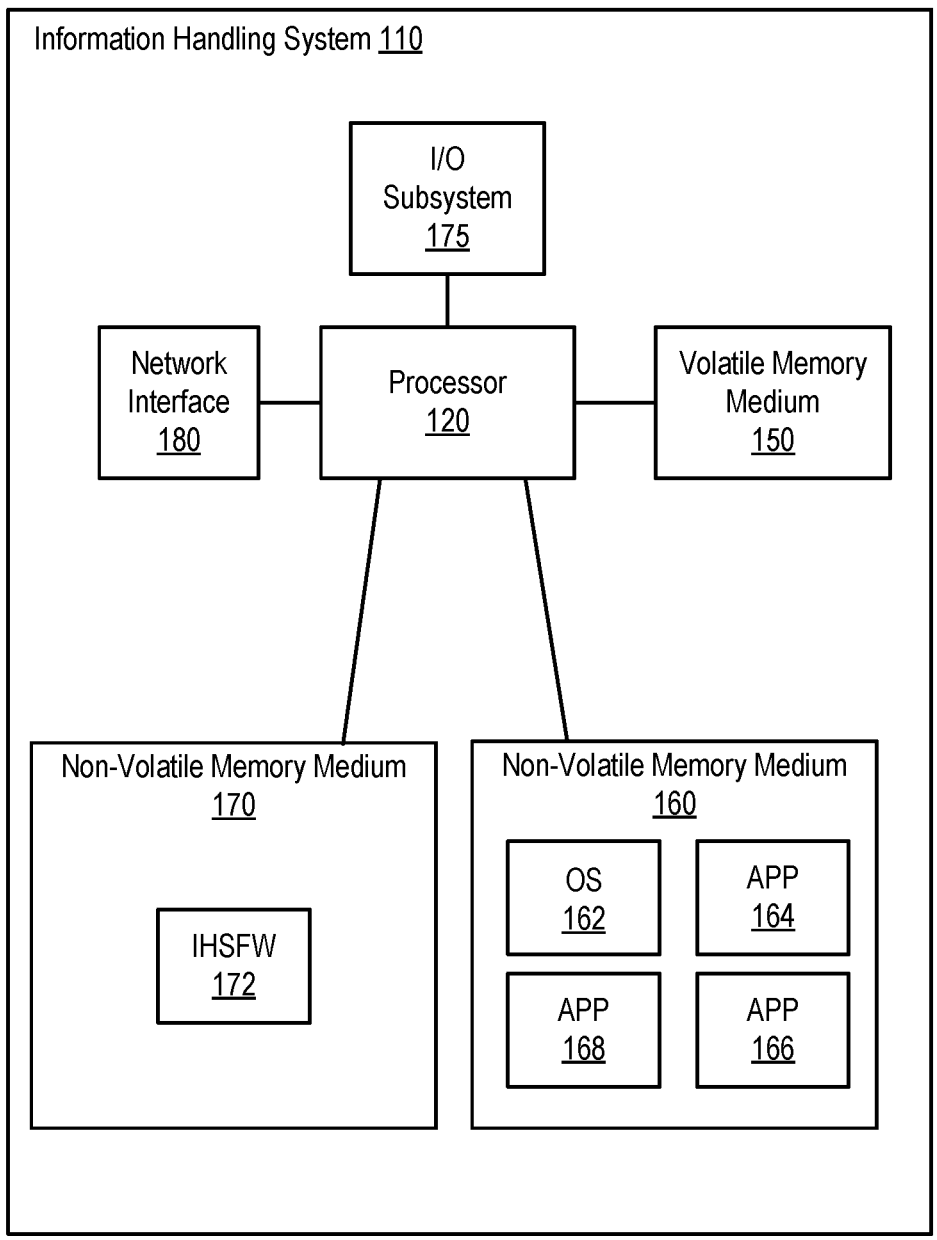
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a method of providing a software update may include providing the software update to a first portion of information handling systems of multiple information handling systems to test the software update. For example, if the software update is successful, the software update may be provided to all other information handling systems of the multiple information handling systems. In one instance, this method may reduce one or more risks in deploying the software update. In another instance, this method may reduce an impact on one or more user experiences and/or may reduce an impact on an information handling system infrastructure.

In one or more embodiments, a method of providing a software update may include providing the software update to multiple portions of information handling systems of multiple information handling systems to test the software update. For example, if the software update is successful with a portion of information handling systems of the multiple information handling systems, the software update may be provided to a next portion of information handling systems of the multiple information handling systems. For instance, the software update may be provided to all portions of the multiple information handling systems if the software update was successful at each previous portion.

In one or more embodiments, the portions of the multiple information handling systems may be static. For example, a first information handling system of the multiple information handling systems may be associated with a first portion of the multiple information handling systems, and a second information handling system may be associated with a second portion of the multiple information handling systems. For instance, the first information handling system may be statically assigned to the first portion of information handling systems, and the second information handling system may be statically assigned to the second portion of information handling systems. In one or more embodiments, information handling systems of the first portion of information handling systems may be chosen for a first deployment of the software update.

In one or more embodiments, issues may arise based at least on the assignments to the static portions of information handling systems. For example, an information handling system of the first portion of information handling systems may be associated with a "poor health". For instance, "poor health" of an information handling system may be associated with one or more issues of the information handling system. As an example, "poor health" of the information handling system may include a cooling issue of the information handling system. For instance, a fan of the information handling system may have failed or may have a less than nominal fan speed. As another example, "poor health" of the information handling system may include a non-volatile memory medium (e.g., a solid state drive, a hard disk drive, etc.) that is at or nearing an end of life.

In one or more embodiments, if an information handling system is associated with "poor health", the information handling system may result in a poor user experience and/or may result in skewing results of testing the software update. In one or more embodiments, users of the information handling systems of the first portion of information handling systems may delay installing software updates. For example, this may delay testing or validating a software update.

In one or more embodiments, a number of information handling systems of a portion of the information handling systems may affect testing of the software update. For example, if a number of information handling systems of a first portion of information handling systems is small compared to a number of information handling systems of the second portion of information handling systems, the first portion of information handling systems may produce accurate results based at least on the number of information handling systems of the first portion of information handling systems, but the results may not be applicable to the second portion of information handling systems.

In one or more embodiments, one or more systems, one or more methods, and/or one or more processes may determine information handling systems of portions of information handling systems of multiple information handling systems based at least on metrics associated with the multiple information handling systems. For example, the metrics associated with the multiple information handling systems may be determined based at least on telemetry data associated with the multiple information handling systems. For instance, the telemetry data may include historical telemetry data and/or near-real time telemetry data, among others.

In one or more embodiments, one or more systems, determining the metrics associated with the multiple information handling systems may include determining multiple scores. For example, determining the multiple scores may include determining an information handling system health and performance score. For instance, the information handling system health and performance score may be a consolidated metric indicative of information handling system health and may be determined based at least on one or more of hardware telemetry of the information handling system, alerts associated with the information handling system, and insights data associated with the information handling system, among others. As an example, the alerts associated with the information handling system may include pre-failure alerts such as predictive device failures (e.g., predictive device failures of hard drives, solid state drives, batteries, etc.), anomaly events (operating system crashes, thermal shutdowns, etc.), and outlier utilization events (e.g., high paging, high read/writes, etc.), among others.

In one or more embodiments, the information handling system health and performance score may be determined based at least on performance metrics such as increased boot/resume times, application crashes and hangs, user initiated forced shutdowns of an information handling system, increased internal temperatures of the information handling system, and fan duty cycle, and fan speed, among others, compared to baseline information associated with the information handling system. In one or more embodiments, determining the multiple scores may include determining an information handling system availability score. For example, the information handling system availability score may be a probability of an availability of the information handling system running at a time of deployment of a software update. For instance, the probability of the availability of the information handling system running at the time of deployment of the software update may be based at least on one or more of a dock connected to the information handling system, the information handling system drawing external power, a charge of a battery of the information handling system, a network connection associated with the information handling system, and a history of a user of the information handling system accepting previous software updates, among others.

In one or more embodiments, determining the multiple scores may include determining an information handling system update churn score. For example, the information handling system update churn score may be based at least on one or more of hardware changes to the information handling system, a software update, an operating system update, an operating system installation, and a device driver update, among others. For instance, the information handling system update churn score may indicate a value associated with an untested configuration of the information handling system. As an example, recent action to the information handling system associated with servicing the information handling system may reduce a likelihood of the information handling system for candidacy for being one of the first information handling systems to receive a software update.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW)

172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figures 2A, 2B:
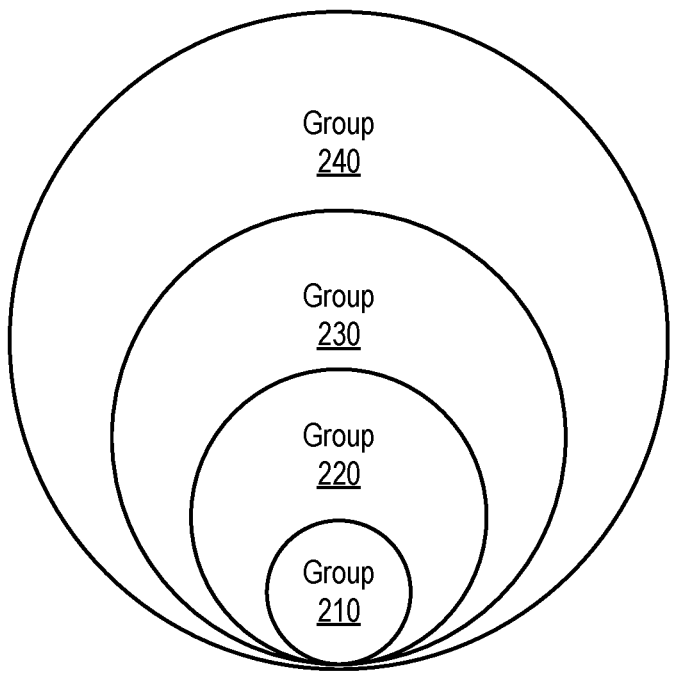
FIG. 2A illustrates an example of groups associated with multiple information handling systems, according to one or more embodiments.
FIG. 2B illustrates an example of a table of information handling system groups that shows movement among the information handling system groups, according to one or more embodiments.

Turning now to FIG. 2A, an example of groups associated with multiple information handling systems is illustrated, according to one or more embodiments. In one or more embodiments, one or more of multiple information handling systems may be associated with a group of multiple groups. In one example, a group 210 may include one or more information handling systems of a test lab or environment. In a second example, a group 220 may include one or more information handling systems of beta test information handling systems. In one instance, the one or more information handling systems associated with group 220 may have been determined to be good working order. In another instance, the one or more information handling systems associated with group 220 may be associated with respective one or more users that are likely to accept a software update. In a third example, a group 230 may include one or more information handling systems of pilot test information handling systems. In another example, a group 240 may include one or more information handling systems of broad deployment information handling systems. For instance, group 240 may include any information handling system that is not included by groups 210-230. As an example, group 240 may be a remaining group. In one or more embodiments, groups 210-240 may be referred to as rings 210-240.

Turning now to FIG. 2B, an example of a table of information handling system groups that shows movement among the information handling system groups is illustrated, according to one or more embodiments. In one or more embodiments, a table 250 may include information handling system groups 210-240. In one example, table 250 shows a distribution of multiple information handling systems based at least on health scores associated with the multiple information handling systems, where group 210 may include one or more information handling systems associated with best health scores and group 240 may include one or more information handling systems associated with low health scores or unknown health scores. In a second example, table 250 shows a distribution of multiple information handling systems based at least on availability scores associated with the multiple information handling systems, where group 210 may include one or more information handling systems associated with best availability scores and group 240 may include one or more information handling systems associated with low availability scores or unknown availability scores. In another example, table 250 shows a distribution of multiple information handling systems based at least on information handling system churn scores associated with the multiple information handling systems, where group 210 may include one or more information handling systems associated with low information handling system churn scores and group 240 may include one or more information handling systems associated with high information handling system churn scores or unknown information handling system churn scores.

Figure 2C:
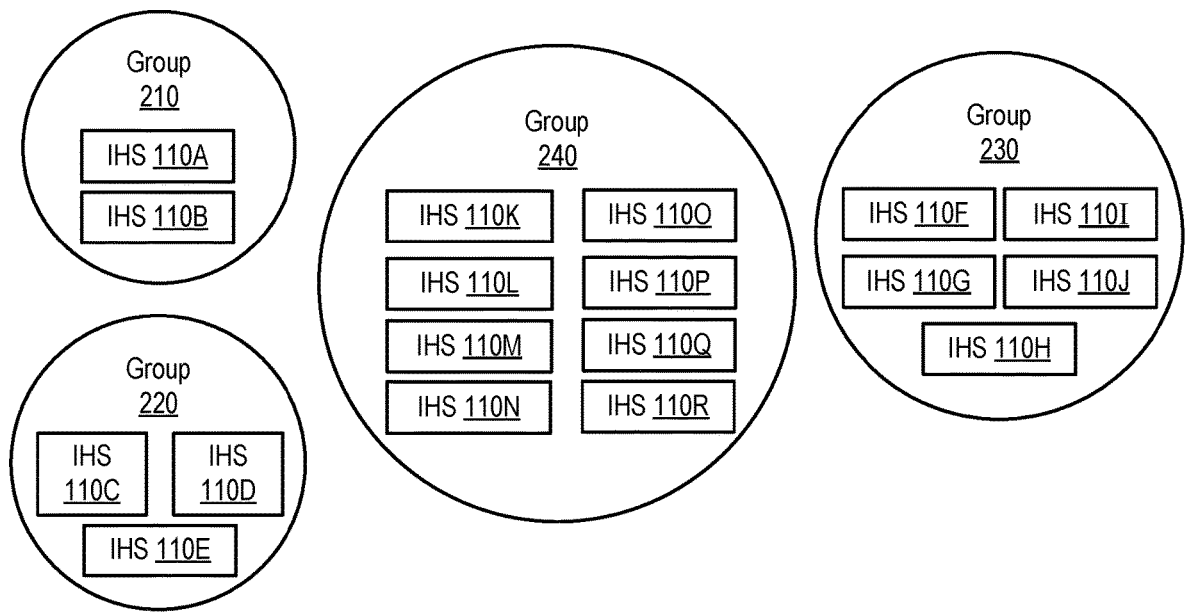
FIG. 2C illustrates an example of information handling systems associated with information handling system groups, according to one or more embodiments.

Turning now to FIG. 2C, an example of information handling systems associated with information handling system groups is illustrated, according to one or more embodiments. As shown, group 210 may include information handling systems (IHSs) 110A and 110B. As illustrated, group 220 may include IHSs 110C-110E. As shown, group 230 may include IHSs 110F-110H. As illustrated, group 240 may include IHSs 110K-110R.

Figure 2D:
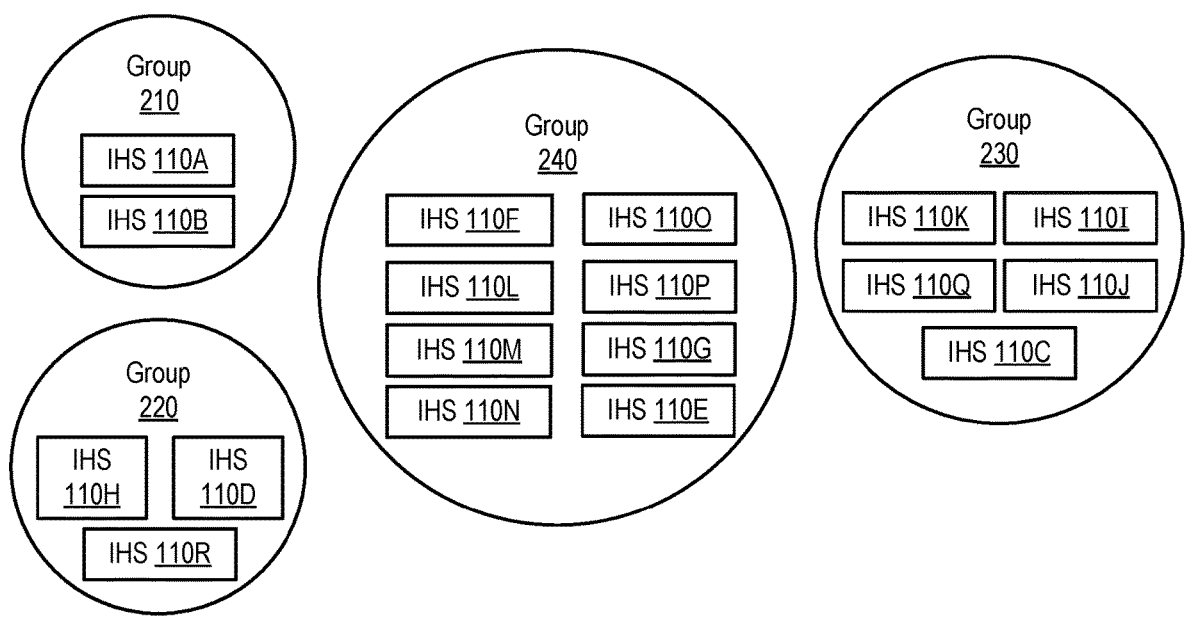
FIG. 2D illustrates another example of information handling systems associated with information handling system groups, according to one or more embodiments.

Turning now to FIG. 2D, another example of information handling systems associated with information handling system groups is illustrated, according to one or more embodiments. As shown, group 210 may include IHSs 110A and 110B. For example, IHSs 110A and 110B may be assigned to a test environment. For instance, IHSs 110A and 110B may be statically assigned to group 210. In one or more embodiments, one or more of IHSs 110C-110R may be associated with different groups after a period of time. For example, one or more of IHSs 110C-110R may be dynamically assigned or dynamically reassigned to groups 220-240. As illustrated, group 220 may include IHSs 110D, 110H, and 110R. As shown, group 230 may include IHSs 110C, 110I-110K, and 110Q. As illustrated, group 240 may include IHSs 110E-110G and 110L-110P.

Figure 3:
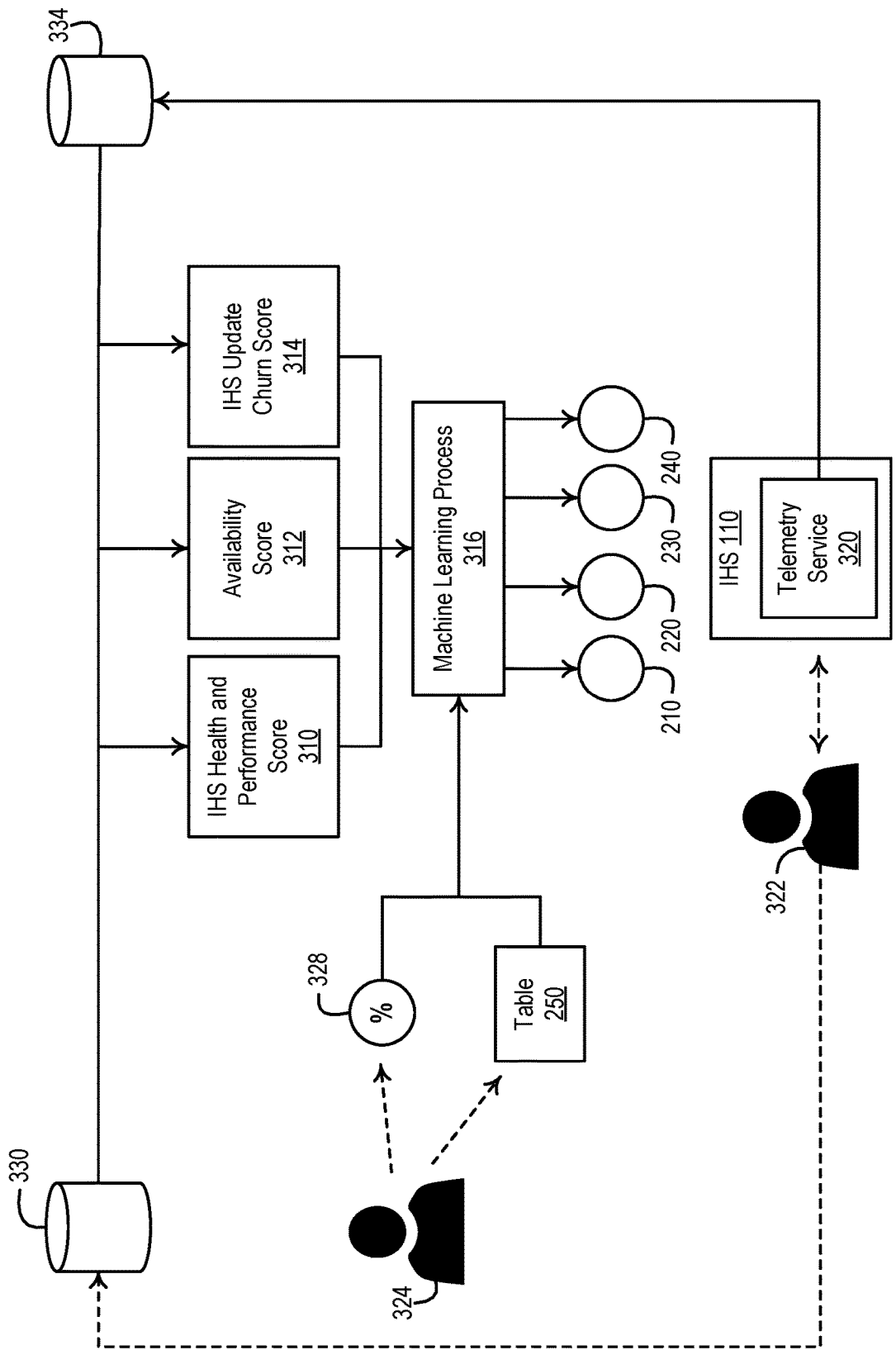
FIG. 3 illustrates an example of a process, according to one or more embodiments.

Turning now to FIG. 3, an example of a process is illustrated, according to one or more embodiments. In one or more embodiments, an IHS 110 of IHSs 110A-110R may provide telemetry data to a telemetry database 334. For example, IHS 110 may include a telemetry service 320. For instance, telemetry service 320 may include instructions executable by processor 120, which, when executed by processor 120, may provide telemetry data to telemetry database 334. As one example, telemetry service 320 may be or may include a WINDOWS® service. As a second example, telemetry service 320 may be or may include a background application. As another example, telemetry service 320 may be or may include a daemon (e.g., a UNIX® daemon, a Unix-like daemon, etc.).

In one or more embodiments, telemetry service 320 may provide telemetry data associated with IHS 110 to telemetry database 334. In one example, the telemetry data may include information indicating how often a user accepts a software update. In a second example, the telemetry data may include information from a Dell Data Vault (DDV) associated with IHS 110. In a third example, the telemetry data may include information associated with user presence. For instance, the telemetry data may include information associated with whether or not a user 322 is currently using IHS 110. In a fourth example, the telemetry data may include information associated with whether or not IHS 110 is coupled to a docking station. In another example, the telemetry data may include information associated with whether or not IHS 110 is powered solely by a battery.

In one or more embodiments, a database 330 may include information associated with issues of IHS 110. In one example, database 330 may include information associated with service tickets of one or more of IHSs 110A-110R. In another example, database 330 may include information associated with servicing performed on one or more of IHSs 110A-110R. For instance, servicing performed on one or more of IHSs 110A-110R may include replacement of one or more components of one or more of IHSs 110A-110R.

In one or more embodiments, an administrator 324 may provide input (e.g., user input). In one example, the input from administrator 324 may include group proportions 328. In one instance, group proportions 328 may include a number of IHSs 110 in each of information handling system groups 210-240. In another instance, group proportions 328 may include a percentage of IHSs 110 in each of information handling system groups 210-240. In another example, the input from administrator 324 may include input to table 250. In one or more embodiments, data from table 250 may be utilized by a machine learning process 316. For example, the machine learning process 316 may utilize the data from table 250 as seed data.

In one or more embodiments, an IHS health and performance score 310, an availability score 312, and a device update churn score 314 may be determined for IHS 110 based at least on information from database 330 and information from database 334. For example, multiple IHS health and performance scores 310, multiple availability scores 312, and multiple device update churn scores 314 may be determined for IHSs 110A-110R.

In one or more embodiments, machine learning process 316 may determine information handling system groups 210-240 based at least on one or more of multiple IHS health and performance scores 310, multiple availability scores 312, and multiple device update churn scores 314 determined for IHSs 110A-110R, group proportions 328, and table 250, among others. For example, machine learning process 316 may be or may include an unsupervised machine learning process. For instance, machine learning process 316 may include one or more of a k-means clustering machine learning process, a density based clustering machine learning process, and an autoencoder machine learning process, among others.

In one or more embodiments, an IHS health and performance score 310 may be determined based at least on multiple attributes associated with IHS 110. For example, the multiple attributes associated with IHS 110 may include one or more of thermal data, a fan speed data, battery data, processor utilization data, memory utilization data, network interface utilization data, and graphics processing unit utilization data, among others.

In one or more embodiments, numerical values may be associated with the multiple attributes associated with IHS 110. For example, an IHS health and performance score 310 may be determined via a sum of the numerical values associated with the multiple attributes associated with IHS 110. For instance, the numerical values associated with the multiple attributes associated with IHS 110 may be weighted. As an example, a numerical value associated with an attribute associated with IHS 110 may be weighted to emphasize or deemphasize the numerical value associated with the attribute. In one instance, a numerical value associated with a fan speed may be deemphasized when IHS 110 is executing a video conferencing application. In a second instance, a numerical value associated with a fan speed may be deemphasized when IHS 110 is executing a video processing application. In this fashion, one or more contexts may be applied via one or more numerical weights, according to one or more embodiments. In another instance, a numerical value associated with a number of reboots within a time period (e.g., a day, a week, a month, etc.) may be emphasized.

In one or more embodiments, based at least on an attribute type and its role in health status, one or more alerts may be generated on a per attribute basis. For example, the one or more alerts may be categorized into critical alerts and informational alerts. For instance, a total count of such alerts may be utilized to determine a score utilizing a logistic process. In one or more embodiments, the one or more alerts may be re-categorized. In one example, an alert that was categorized as a critical alert may be re-categorized as an informational alert. In another example, an alert that was categorized as an informational alert may be re-categorized as a critical alert. In one or more embodiments, categorizing and/or re-categorizing an alert as an informational alert or a critical alert may be performed by an original equipment manufacturer and/or an administrator.

In one or more embodiments, a health score for an attribute may be determined via subtracting an alert score for the attribute from a numerical value of one (1). For example, the alert score may be determined via $$\text{Alert Score} = \frac{1}{1+e^{-\frac{x_C}{\lambda_C}}} + w_i \cdot \left( \frac{1}{1+e^{-\frac{x_i}{\lambda_i}}} - 0.5 \right),$$

where $x_C$ is a numerical value (e.g., a count) of a critical alert for the attribute, $\lambda_C$ is a scaling numerical value for the critical alert for the attribute, $x_i$ is a numerical value (e.g., a count) of an informational alert for the attribute, $\lambda_i$ is a scaling numerical value for the informational alert for the attribute, and $w_1$ is a numerical weighting value for the informational alert for the attribute.

In one or more embodiments, a contextual score may be calculated based at least on a prediction error of selected response attributes. For example, determining a prediction error, multiple attributes may be utilized as predictor variables and others as response variables. In one or more embodiments, regression models may be trained utilizing deep neural networks. For example, this may provide another health score for IHS 110. In one or more embodiments, a final health score may be determined via a weighted sum of an alert health score, a health score density, and a health score context. For example, the final health score may be determined via $$\text{Final Health Score} = \frac{w_1 \cdot \text{alert health score} + w_2 \cdot \text{health score density} + w_3 \cdot \text{health score context}}{w_1 + w_2 + w_3},$$

where $w_1$, $w_2$, and $w_3$ are numerical weights.

In one or more embodiments, an IHS health and performance score 310 may indicate a status of IHS 110. For example, IHS health and performance score 310 may be based at least on N number of attributes associated with IHS 110. In one instance, IHS health and performance score 310 may be determined via $$\text{IHS Health and Performance Score} = \frac{\sum_{j=1}^{N} \text{Health Score}_j \cdot w_j}{\sum_{j=1}^{N} w_j},$$

where $\text{Health Score}_j$ is a numerical health score for a jth attribute and $w_j$ is a numerical weight for the jth attribute. In another instance, IHS health and performance score 310 may be determined via $$\text{IHS Health and Performance Score} = \frac{\sum_{j=1}^{N} (1 - \text{Alert Score}_j) \cdot w_j}{\sum_{j=1}^{N} w_j},$$

where Alert Score$_j$ is a numerical alert score for the jth attribute and w$_j$ is a numerical weight for the jth attribute.

In one or more embodiments, alerts may be related to one or more domains. For example, the one or more domains include an operating system domain, a storage domain. A utilization domain, a battery domain, a thermal domain, and a system events domain, among others. In one or more embodiments, an alert attribute may include: kernel crash was detected, reallocated sector count has increased, reallocated sector count is above a threshold, battery soft failures were detected, battery permanent failures were detected, large drop in battery capacity detected, processor activity detected above a threshold, disk read activity is above a threshold, disk write activity is above a threshold, forced shutdowns is above a threshold, increase in hard disk drive free fall events, paging activity is above a threshold, remaining battery capacity is below a threshold, hard disk temperatures is above a threshold, processor temperature is above a threshold, system model name change detected, IHSFW version change detected, operating system change detected, motherboard change detected disk change detected, LAN adapter MAC (media access control) address change detected, WLAN (wireless LAN) adapter MAC address change detected, WWAN (wireless wide area network) device change detected, battery name change detected, memory change detected, bluetooth adapter address change detected, volatile memory medium change detected, battery serial number change detected, thermal fan related IHSFW logs, IHSFW led code detected, cable status change detected, reallocated sector count SMART (Self-Monitoring Analysis and Reporting Technology) threshold exceeded, read error rate SMART threshold exceeded, spinup time SMART threshold exceeded, high reserved blocks, desktop fan failure, wear leveling count is above a threshold, system diagnostics scan failure, program erase cycle count is above a threshold, reallocated sector count has increased, reallocated sector count is above a threshold, or reallocated sector count SMART threshold exceeded, among others. In one or more embodiments, telemetry database 334 may store telemetry data associated with IHSs 110A-110R. In one or more embodiments, telemetry data 334 may include telemetry data associated with IHSs 110A-110R.

Figure 4A:
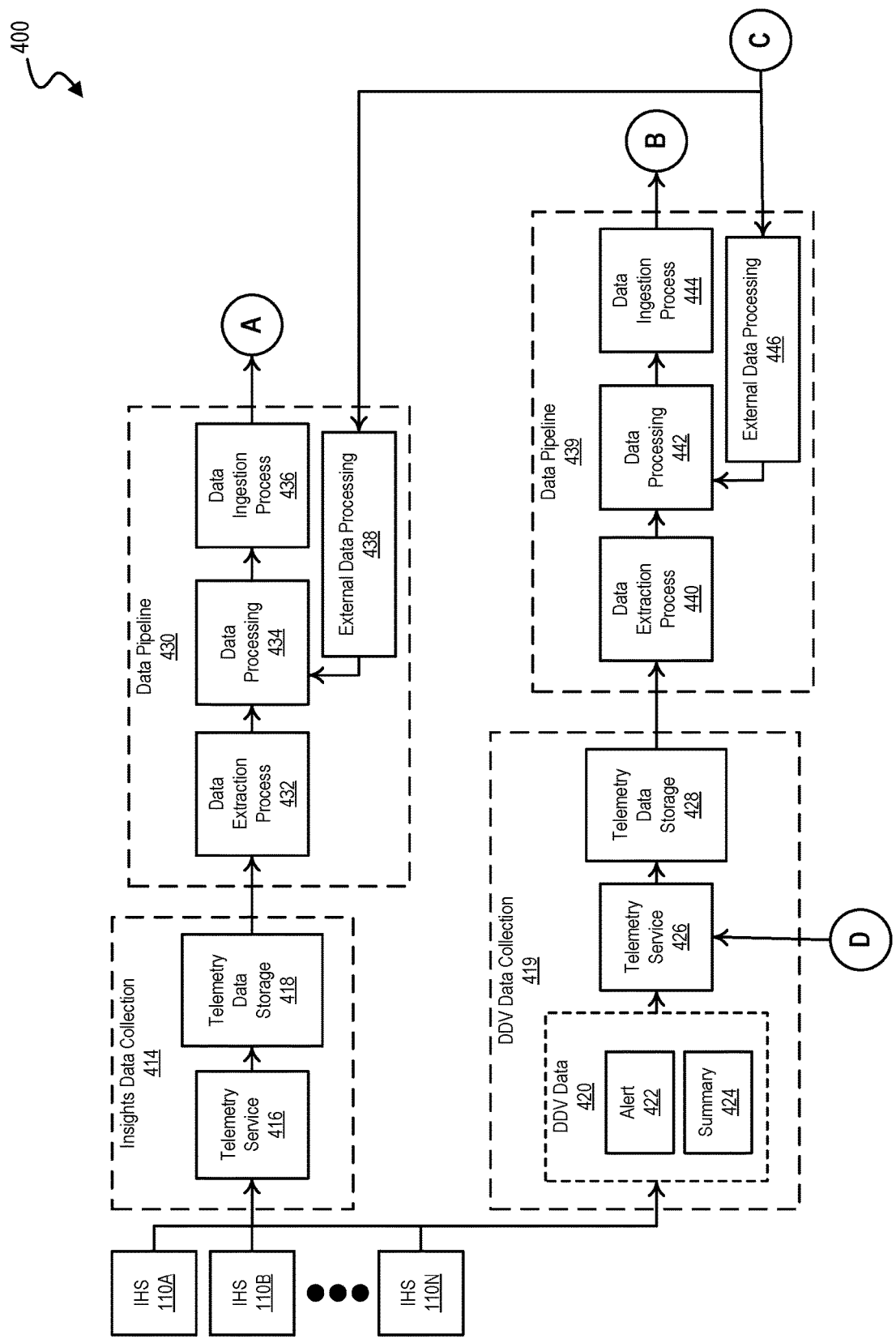
FIGS. 4A and 4B illustrate an example of a system, according to one or more embodiments.
Figure 4B:
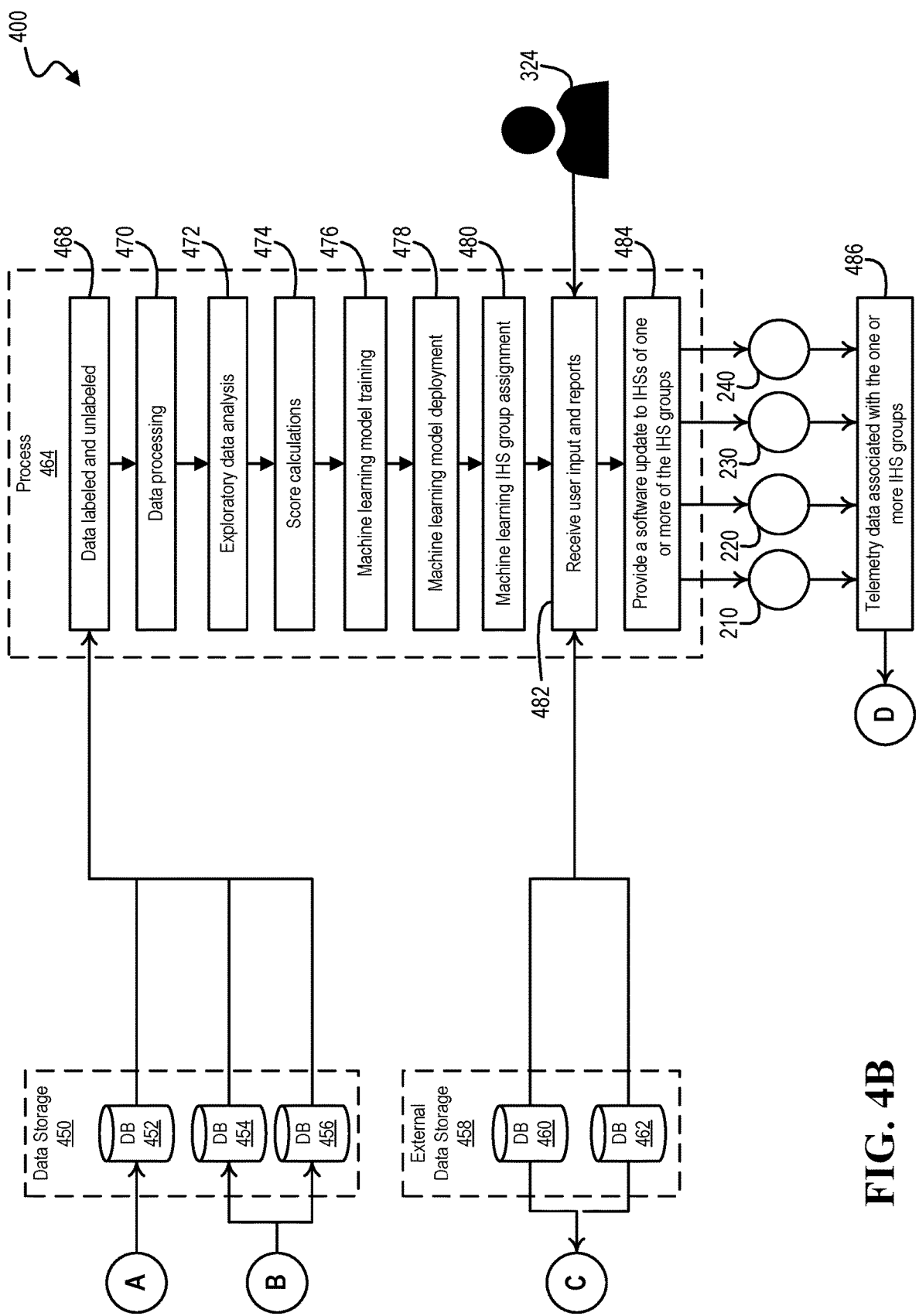

Turning now to FIGS. 4A and 4B, an example of a system is illustrated, according to one or more embodiments. In one or more embodiments, a system 400 may include an insights data collection 414. For example, insights data collection 414 may receive telemetry data from IHSs 110A-110R. In one or more embodiments, insights data collection 414 may include a telemetry service 416. For example, telemetry service 416 may receive telemetry data from IHSs 110A-110R. In one or more embodiments, insights data collection 414 may include a telemetry data storage 418. For example, telemetry data storage 418 may receive telemetry data from telemetry service 416. For instance, telemetry data storage 418 may store telemetry data received from telemetry service 416 and associated with IHSs 110A-110R.

In one or more embodiments, system 400 may include a data pipeline 432. For example, data pipeline 430 may include a data extraction process 432. For instance, data extraction process 432 may extract telemetry data from telemetry data storage 418. In one or more embodiments, data pipeline 432 may include data processing 434. For example, data processing 434 may receive telemetry data from data extraction process 432. In one or more embodiments, data pipeline 430 may include an external data processing 438. For example, external data processing 438 may receive data from an external data storage 458. For instance, data processing 434 may receive data from external data processing 438.

In one or more embodiments, data pipeline 432 may include a data ingestion process 436. For example, data ingestion process 436 may receive data from data processing 434. For example, data ingestion process 436 may prepare the data from data processing 434 to be stored. As an example, data ingestion process 436 may provide prepared data to a database (DB) 452. In one or more embodiments, system 400 may include a data storage 450. For example, data storage 450 may include one or more databases. For instance, data storage 450 may include databases 452-456, among others.

In one or more embodiments, a database may include an organized collection of data stored and accessed electronically via an information handling system. For example, a database may include a database management system (DBMS), which may include software that interacts with one or more information handling systems and/or users, applications. For instance, the term "database" may be utilized to refer to one or more of a DBMS, a database system, and an application associated with the database, among others. In one or more embodiments, a database may include a relational database. For example, a relational database may model data as rows and columns via one or more tables. In one or more embodiments, a database may include a non-relational database.

In one or more embodiments, system 400 may include DDV data collection 419. For example, insights DDV data collection 419 may receive telemetry data from IHSs 110A-110R. In one or more embodiments, DDV data collection 419 may store DDV data 420. For example, DDV data 420 may include alert data 422 and summery data 424, which may be associated with alert data 422. In one or more embodiments, DDV data collection 419 may include a telemetry service 426. For example, telemetry service 426 may receive DDV data 420.

In one or more embodiments, DDV data collection 419 may include a telemetry data storage 428. For example, telemetry data storage 428 may receive telemetry data from telemetry service 426. In one instance, telemetry data storage 428 may store telemetry data received from telemetry service 426 and associated with DDV data 420. In another instance, telemetry data storage 428 may store telemetry data received from telemetry service 426 and associated with IHSs 110A-110R.

In one or more embodiments, system 400 may include a data pipeline 439. For example, data pipeline 439 may include a data extraction process 440. For instance, data extraction process 440 may extract telemetry data from telemetry data storage 428. In one or more embodiments, data pipeline 439 may include data processing 442. For example, data processing 442 may receive telemetry data from data extraction process 440. In one or more embodiments, data pipeline 439 may include an external data processing 446. For example, external data processing 446 may receive data from external data storage 458. For instance, data processing 442 may receive data from external data processing 446.

In one or more embodiments, data pipeline 439 may include a data ingestion process 444. For example, data ingestion process 444 may receive data from data processing 442. For example, data ingestion process 444 may prepare the data from data processing 442 to be stored. As an example, data ingestion process 444 may provide prepared data to one or more of databases 454 and 456.

In one or more embodiments, system 400 may include a process 464. For example, process 464 may include process elements 468-484. At 468, data may be labeled and unlabeled. For example, data from one or more of databases 452-456 may be labeled and unlabeled. At 470, data may be processed. At 472, exploratory data analysis may be performed. At 474, scores may be calculated. For example, scores associated with IHSs 110A-110R may be calculated. At 476, a machine learning model may be trained. For example, the machine learning model may be or may include machine learning process 316.

At 478, the machine learning model may be deployed. At 480, the machine learning model may assign information handling systems to information handling system groups. At 482, user input and reports may be received. In one example, reports from one or more of databases 460 and 462 may be received. In one instance, database 460 may include database 330. In another instance, database 460 may include data from database 330. In another example, user input from administrator 324 may be received. At 484, a software update may be provided to information handling systems of one or more of the information handling system groups. At 486, telemetry data associated with the one or more information handling system groups may be provided to telemetry service 426. Although not specifically illustrated, process 464 may include process element 486, according to one or more embodiments.

Figure 5:
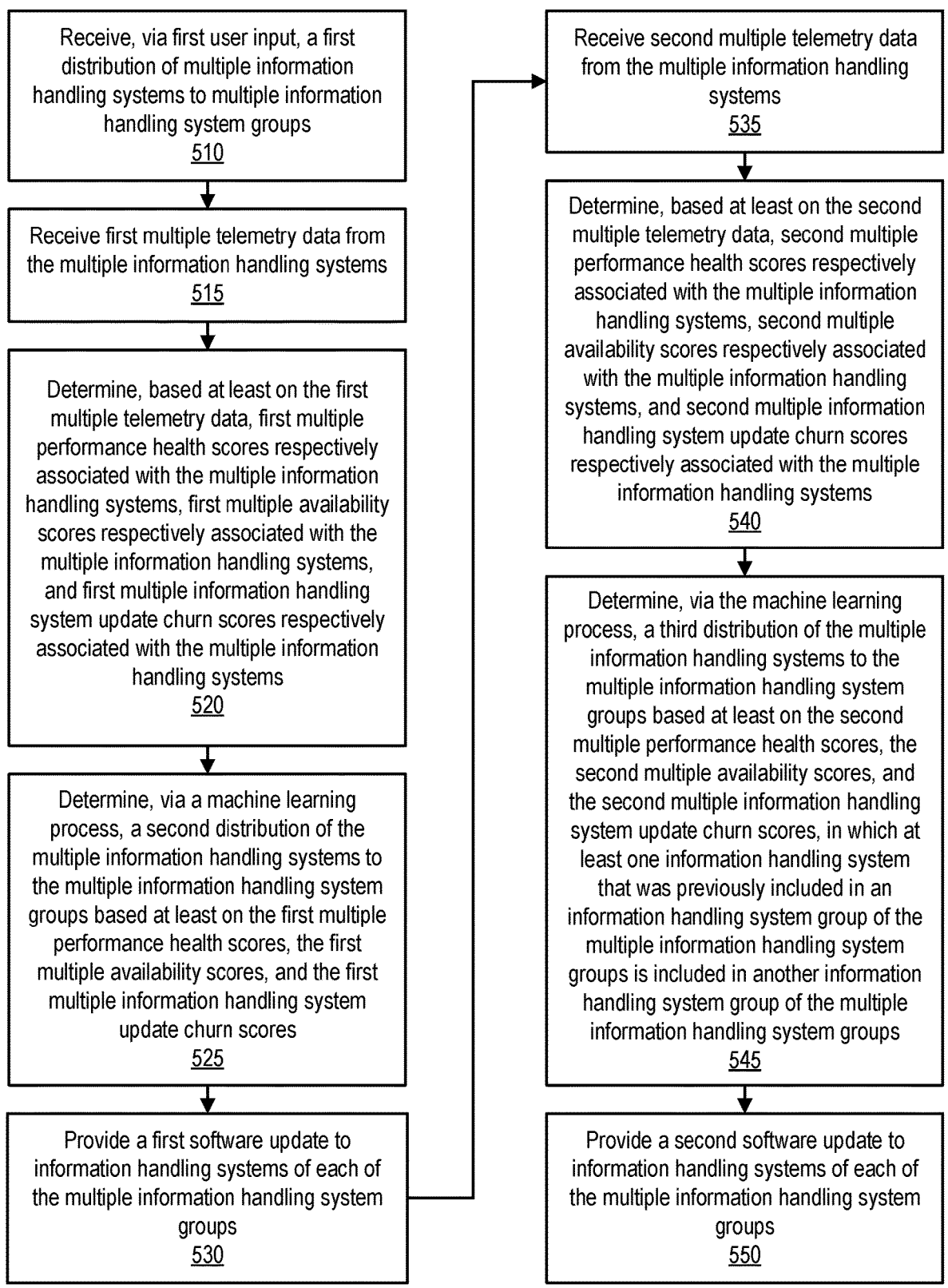
FIG. 5 illustrates an example of a method of operating a system, according to one or more embodiments.

Turning now to FIG. 5, an example of a method of operating a system is illustrated, according to one or more embodiments. At 510, a first distribution of multiple information handling systems to a plurality of information handling system groups may be received via first user input. For example, group proportions 328 may be received. At 515, first multiple telemetry data from the multiple information handling systems may be received. For example, first multiple telemetry data may be received from IHSs 110A-110R. At 520, first multiple performance health scores respectively associated with the multiple information handling systems, first multiple availability scores respectively associated with the multiple information handling systems, and first multiple information handling system update churn scores respectively associated with the multiple information handling systems may be determined based at least on the first multiple telemetry data.

At 525, a second distribution of the multiple information handling systems to the multiple information handling system groups may be determined based at least on the first multiple performance health scores, the first multiple availability scores, and the first multiple information handling system update churn scores via a machine learning process. For example, machine learning process 316 may determine a second distribution of the multiple information handling systems to the multiple information handling system groups based at least on the first multiple performance health scores, the first multiple available scores, and the first multiple information handling system update churn scores.

In one or more embodiments, the machine learning process may determine the second distribution of the multiple information handling systems to the multiple information handling system groups further based at least on the first distribution of multiple information handling systems to multiple information handling system groups. In one or more embodiments, the second distribution of the multiple information handling systems to the multiple information handling system groups may be different from the first distribution of the multiple information handling systems to the multiple information handling system groups.

At 530, a first software update may be provided to information handling systems of each of the multiple information handling system groups. For example, a first software update may be provided to information handling systems of each of information handling system groups 210-240. For instance, information handling system groups 210-240 may include information handling systems as illustrated in FIG. 2C. At 535, second multiple telemetry data may be received from the multiple information handling systems. For example, second multiple telemetry data may be received from IHSs 110A-110R. At 540, second multiple performance health scores respectively associated with the multiple information handling systems, second multiple availability scores respectively associated with the multiple information handling systems, and second multiple information handling system update churn scores respectively associated with the multiple information handling systems may be determined based at least on the second multiple telemetry data.

At 545, a third distribution of the multiple information handling systems to the multiple information handling system groups may be determined based at least on the second multiple performance health scores, the second multiple availability scores, and the second multiple information handling system update churn scores, in which at least one information handling system that was previously included in an information handling system group of the multiple information handling system groups is included in another information handling system group of the multiple information handling system groups via the machine learning process. For example, machine learning process 316 may determine a third distribution of the multiple information handling systems to the multiple information handling system groups based at least on the second multiple performance health scores, the second multiple available scores, and the second multiple information handling system update churn scores.

In one or more embodiments, the third distribution of the multiple information handling systems to the multiple information handling system groups may be different from the second distribution of the multiple information handling systems to the multiple information handling system groups. For example, the third distribution of the multiple information handling systems to the multiple information handling system groups may be as illustrated in FIG. 2D. At 550 a second software update may be provided to information handling systems of each of the multiple information handling system groups. For example, a second software update may be provided to information handling systems of each of information handling system groups 210-240. For instance, information handling system groups 210-240 may include information handling systems as illustrated in FIG. 2D.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
    at least one processor; and
    a memory medium, coupled to the at least one processor, that stores instructions executable by the at least one processor, which when executed by the at least one processor, cause the system to:
    receive, via first user input, a first distribution of a plurality of information handling systems to a plurality of information handling system groups;
    receive a first plurality of telemetry data from the plurality of information handling systems;
    determine, based at least on the first plurality of telemetry data, a first plurality of performance health scores respectively associated with the plurality of information handling systems, a first plurality of availability scores respectively associated with the plurality of information handling systems, and a first plurality of information handling system update churn scores respectively associated with the plurality of information handling systems;
    determine, via a machine learning process, a second distribution of the plurality of information handling systems to the plurality of information handling system groups based at least on the first plurality of performance health scores, the first plurality of availability scores, and the first plurality of information handling system update churn scores;
    provide a first software update to information handling systems of each of the plurality of information handling system groups;
    receive a second plurality of telemetry data from the plurality of information handling systems;
    determine, based at least on the second plurality of telemetry data, a second plurality of performance health scores respectively associated with the plurality of information handling systems, a second plurality of availability scores respectively associated with the plurality of information handling systems, and a second plurality of information handling system update churn scores respectively associated with the plurality of information handling systems;
    determine, via the machine learning process, a third distribution of the plurality of information handling systems to the plurality of information handling system groups based at least on the second plurality of performance health scores, the second plurality of availability scores, and the second plurality of information handling system update churn scores, wherein at least one information handling system that was previously included in an information handling system group of the plurality of information handling system groups is included in another information handling system group of the plurality of information handling system groups; and
    provide a second software update to information handling systems of each of the plurality of information handling system groups.

2. The system of claim 1, wherein, to determine the first plurality of performance health scores, the instructions cause the system to determine a plurality of alert scores respectively associated with the plurality of information handling systems.

3. The system of claim 2, wherein, to determine the plurality of alert scores, the instructions further cause the system to determine a plurality of numerical values associated with a plurality of attributes associated with the plurality of information handling systems.

4. The system of claim 3, wherein, to determine the plurality of alert scores, the instructions further cause the system to weight the plurality of numerical values associated with the plurality of attributes.

5. The system of claim 1, wherein the machine learning process includes at least one of a k-means clustering machine learning process, a density based clustering machine learning process, and an autoencoder machine learning process.

6. The system of claim 1,
    wherein the instructions further cause the system to receive, via second user input, a plurality of percentages of the plurality of information handling systems respectively associated with the plurality of information handling system groups; and
    wherein the second distribution distributes the plurality of information handling systems to the plurality of information handling system groups in accordance with the plurality of percentages.

7. A method, comprising:
    receiving, via first user input, a first distribution of a plurality of information handling systems to a plurality of information handling system groups;
    receiving a first plurality of telemetry data from the plurality of information handling systems;
    determining, based at least on the first plurality of telemetry data, a first plurality of performance health scores respectively associated with the plurality of information handling systems, a first plurality of availability scores respectively associated with the plurality of information handling systems, and a first plurality of information handling system update churn scores respectively associated with the plurality of information handling systems;
    determining, via a machine learning process, a second distribution of the plurality of information handling systems to the plurality of information handling system groups based at least on the first plurality of performance health scores, the first plurality of availability scores, and the first plurality of information handling system update churn scores;
    providing a first software update to information handling systems of each of the plurality of information handling system groups;

receiving a second plurality of telemetry data from the plurality of information handling systems;

determining, based at least on the second plurality of telemetry data, a second plurality of performance health scores respectively associated with the plurality of information handling systems, a second plurality of availability scores respectively associated with the plurality of information handling systems, and a second plurality of information handling system update churn scores respectively associated with the plurality of information handling systems;

determining, via the machine learning process, a third distribution of the plurality of information handling systems to the plurality of information handling system groups based at least on the second plurality of performance health scores, the second plurality of availability scores, and the second plurality of information handling system update churn scores, wherein at least one information handling system that was previously included in an information handling system group of the plurality of information handling system groups is included in another information handling system group of the plurality of information handling system groups; and providing a second software update to information handling systems of each of the plurality of information handling system groups.

8. The method of claim 7, wherein the determining the first plurality of performance health scores includes determining a plurality of alert scores respectively associated with the plurality of information handling systems.

9. The method of claim 8, wherein the determining the plurality of alert scores includes determining a plurality of numerical values associated with a plurality of attributes associated with the plurality of information handling systems.

10. The method of claim 9, wherein the determining the plurality of alert scores includes weighting the plurality of numerical values associated with the plurality of attributes.

11. The method of claim 7, wherein the machine learning process includes at least one of a k-means clustering machine learning process, a density based clustering machine learning process, and an autoencoder machine learning process.

12. The method of claim 7, further comprising:
receiving, via second user input, a plurality of percentages of the plurality of information handling systems respectively associated with the plurality of information handling system groups;
wherein the second distribution distributes the plurality of information handling systems to the plurality of information handling system groups in accordance with the plurality of percentages.

13. A non-transitory computer-readable non-transitory memory medium that includes instructions that, when executed by at least one processor of a system, cause the system to:
receive, via first user input, a first distribution of a plurality of information handling systems to a plurality of information handling system groups;
receive a first plurality of telemetry data from the plurality of information handling systems;
determine, based at least on the first plurality of telemetry data, a first plurality of performance health scores respectively associated with the plurality of information handling systems, a first plurality of availability scores respectively associated with the plurality of information handling systems, and a first plurality of information handling system update churn scores respectively associated with the plurality of information handling systems;

determine, via a machine learning process, a second distribution of the plurality of information handling systems to the plurality of information handling system groups based at least on the first plurality of performance health scores, the first plurality of availability scores, and the first plurality of information handling system update churn scores;

provide a first software update to information handling systems of each of the plurality of information handling system groups;

receive a second plurality of telemetry data from the plurality of information handling systems;

determine, based at least on the second plurality of telemetry data, a second plurality of performance health scores respectively associated with the plurality of information handling systems, a second plurality of availability scores respectively associated with the plurality of information handling systems, and a second plurality of information handling system update churn scores respectively associated with the plurality of information handling systems;

determine, via the machine learning process, a third distribution of the plurality of information handling systems to the plurality of information handling system groups based at least on the second plurality of performance health scores, the second plurality of availability scores, and the second plurality of information handling system update churn scores, wherein at least one information handling system that was previously included in an information handling system group of the plurality of information handling system groups is included in another information handling system group of the plurality of information handling system groups; and provide a second software update to information handling systems of each of the plurality of information handling system groups.

14. The non-transitory computer-readable non-transitory memory medium of claim 13, wherein, to determine the first plurality of performance health scores, the instructions cause the system to determine a plurality of alert scores respectively associated with the plurality of information handling systems.

15. The non-transitory computer-readable non-transitory memory medium of claim 14, wherein, to determine the plurality of alert scores, the instructions further cause the system to determine a plurality of numerical values associated with a plurality of attributes associated with the plurality of information handling systems.

16. The non-transitory computer-readable non-transitory memory medium of claim 15, wherein, to determine the plurality of alert scores, the instructions further cause the system to weight the plurality of numerical values associated with the plurality of attributes.

17. The non-transitory computer-readable non-transitory memory medium of claim 13,
wherein the instructions further cause the system to receive, via second user input, a plurality of percentages of the plurality of information handling systems respectively associated with the plurality of information handling system groups; and wherein the second distribution distributes the plurality of information handling systems to the plurality of information handling system groups in accordance with the plurality of percentages.

* * * * *